Dec. 26, 1967　　　R. A. KUMMERER ETAL　　　3,359,814
CHAIN
Filed May 5, 1965

*INVENTORS*
RICHARD A. KUMMERER,
ALFRED DEN BESTEN &
JOSEPH T. CHESTER

*William A. Murray*
ATTORNEY

United States Patent Office 3,359,814
Patented Dec. 26, 1967

3,359,814
CHAIN
Richard A. Kummerer, 500 6th Ave., Alfred Den Besten, 1304 8th Ave., and Joseph T. Chester, 8 Sharon Lane, all of Fulton, Ill. 61252
Filed May 5, 1965, Ser. No. 453,372
17 Claims. (Cl. 74—245)

ABSTRACT OF THE DISCLOSURE

A chain link that includes a U-shaped link member having opposite side portions joined at one end by an arcuate shaped bight portion and further having pin-receivings at opposite ends of the side portions; a pin structure extending through the openings at the bight portion that includes opposite ends smaller than the latter openings and a central or bushing portion that bears against the bight portion and retains the ends of the pin structure out of contact with the edges of the latter openings.

---

This invention relates to a chain structure and more particularly to an improved chain link structure. This invention further relates to a method of connecting and journalling the links of a chain.

In U.S. Patent 3,054,301, there is shown and described a chain link composed of a single U-shaped member having a pair of opposed sides and an interconnecting cross piece. A pair of pin openings is provided in the sides adjacent the cross piece and a pin is passed through the openings and bears against the cross piece in a line contact therewith. The cross piece is arcuate shaped to provide better contact with sprocket teeth.

It is contemplated in the above for the chain sprockets to drive the chain predominantly in only one direction and for the sprocket teeth to bear against the arcuate cross piece and not the pin. The pin, being relatively small, provides a poor surface of contact with the sprocket teeth, and if driven by direct contact with the teeth creates wear and damage to the sprocket and pin.

Also, upon the pin pivoting in the openings in the link sides, there are created wear points between edges of the openings and the ends of the pin. This often causes failure of the chain linkage. Even further, the pin in this type of linkage often distorts or bends slightly between the link sides to thereby reduce the strength of the linkage and to reduce materially the fatigue life of the linkage.

With the above in mind, it is the primary object of the present invention to provide a new and novel link structure incorporating the advantages of the link structure set forth in the above U.S. patent and also to provide improved structure that overcomes the problems and disadvantages as above set forth.

Specifically it is the object of the present invention to provide a U-shaped chain link having opposite side or leg portions and an arcuate shaped bight portion. The side portions have a pair of transversely aligned slots elongated longitudinally and disposed adjacent the bight portion. A link pin structure extends through the slots and between the sides and has small ends capable of shifting longitudinally in the slots. An enlarged central portion is positioned between the sides and has an outer surface that engages the inner arcuate surface of the arcuate bight portion. The pin structure is composed of a pin and a bushing, the latter forming the large central portion. The bushing is substantially equal to the transverse spacing between the sides and the thickness of the bushing is such that the pin is held in a spaced relation to the ends of the slotted openings.

It is a further object of the invention to provide a new and novel method of making a chain linkage comprising overlapping the sides of adjacent U-shaped links so that the open end of one link is outside of the closed end of an adjacent link and pin openings in the sides at the open end are aligned with openings at the closed end; to provide a bushing member between the sides of the closed end in axial alignment with the openings; to drive a pin through the openings and bushing in a press fit relation to the bushing; and to fix the ends of the pin to the sides at one open end so as to prevent rotation of the pin relative thereto.

Other objects and advantages of the invention will become apparent to those skilled in the art as the nature of the invention is better understood from the following description and as shown in the accompanying drawings.

Figure 1:
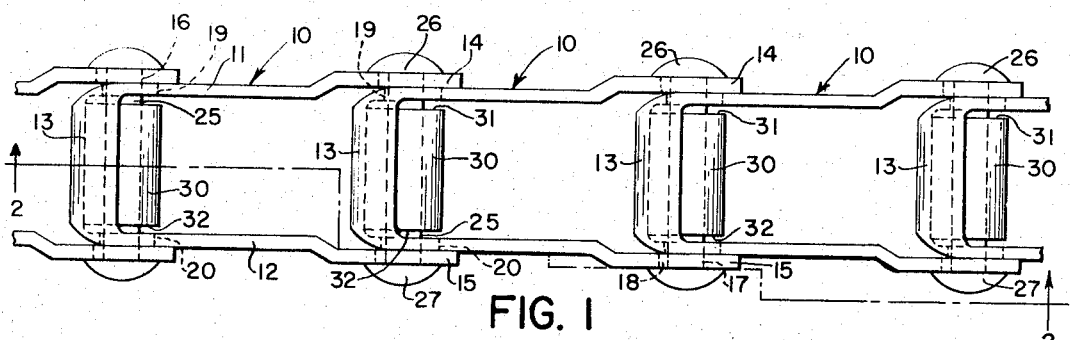
FIG. 1 is a plan view of the chain linkage incorporating the structure of the present invention.

Referring now to the drawings, each link of the chain is composed of a U-shaped metal strap or link member 10 with opposite elongated sides 11, 12 and having an open end and a closed end, the latter being created by a transverse bight portion 13. The bight portion 13 is arcuate shaped and is formed about a horizontal axis extending between the side portions 11, 12. Ends 14, 15 at the open end of the link member 10 are offset or flared outwardly and consequently may lie alongside the sides of an adjacent link at the closed end of the link. The ends 14, 15 have transversely aligned openings 16, 17 with notches 18 cut in the edges of the openings. Pin-receiving openings or slots 19, 20, elongated longitudinally in respect to the side portions 11, 12, are formed in the sides 11, 12 adjacent the bight portion 13. Even though arcuate shaped, the upper and lower edges of the bight portion 13 are substantially continuous and coplanar with the upper and lower edges of the sides 11, 12.

Extending through the openings 16, 19 and 17, 20, when in registry, are transverse pivot pin structures that include as parts thereof pivot pins 25. In the final assembly the pins 25 have spun or rounded caps 26, 27 that bear against the outer surfaces of the respective ends 14, 15. Portions 28 of the pins 25 extend into the notches 18 and retain the pins 25 against rotation in respect to the flared ends 14, 15. The pins 25 are free to rotate in the slots 19, 20.

Figure 2:
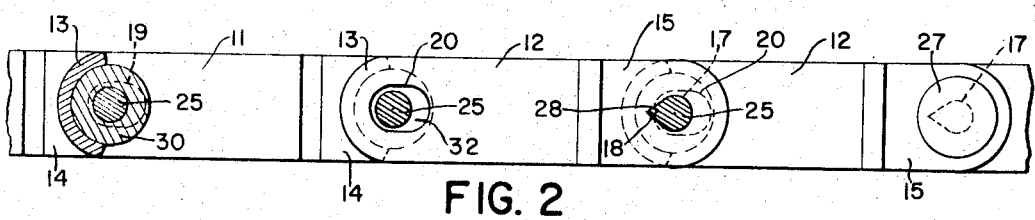
FIG. 2 is a view, partially in section, of the structure shown in FIG. 1 and as taken along the line 2—2 of FIG. 1.

Enlarged central portions created by bushings 30 are carried on and fixed to the pins 25 between the inner surfaces of the sides 11, 12. The bushings 30 are cylindrical in cross section and have opposite ends 31, 32 closely adjacent the sides 11, 12. Upon load being applied to the chain, the outer surfaces of the bushings 30 bear against the inner surfaces of the arcuate portions 13 and are of such radial thickness to retain the pins 25 between the ends of the respective slots 19, 20. Consequently the pins 25 do not bear directly on ends of the slots. As may be seen clearly in FIG. 2, the arcuate portion 13 is formed substantially about the axis of the bushing 30 when the bushing is bearing against the portion 13. The arcuate portion 13 is partially cylindrical and approaches being semi-cylindrical with the inner surface thereof having substantially the same radial dimension as the outer surface of the bushing 30. As a result the pin 25 is retained also against bearing against the upper and lower edges of the slots 19, 20.

Figures 3, 4, 5, 6:
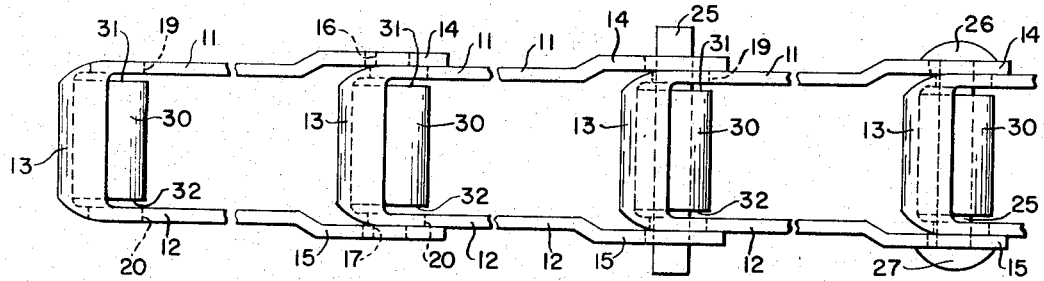
FIGS. 3–6 are plan views of a linkage joint showing the procedural steps in building the joint.

The steps in assembling the linkage are shown in FIGS. 3 through 6 and comprises placing a bushing 30 adjacent the arcuate bight portion 13 as shown in FIG. 3 and axially aligning the openings 16, 17 with the slots 19, 20. The bushing 30 is axially aligned with the openings 16, 17, 19 and 20. A pin 25 is then driven through the aligned openings and bushing with a press fit being applied between the pin and the bushing to thereby lock the bushing on the pin. The final operation is to spin the heads 26, 27 and to force the portions 28 into the notches 18 to thereby lock the pins against rotation relative to the flared end portions 14, 15 and against axial movement.

In operation the bushing 30 serves as a spacer between the pin 25 and arcuate portion 13 and operates to rigidify the pin so as to prevent flexing or bending of the pin. It serves further to position the pin in the openings 19, 20 so that it does not contact the edges of the openings and thereby create wear points. In this respect it should be noted there is sufficient overlie and underlie of the arcuate portion 13 in respect to the bushing 30 to prevent the pin from contacting the upper and/or lower edges of the openings 19, 20.

Figure 7:
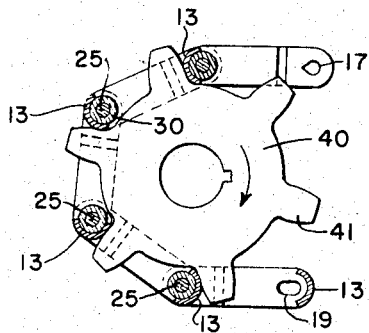
FIG. 7 is a side view of a sprocket and the chain linkage with the linkage shown in section to show the relationship between the linkage and sprocket teeth.

When operating over sprockets, such as at 40, the teeth 41 will normally contact the outer surfaces of the bight portions 13 and drive the chain links. The upper and lower transverse edges of the bight portions tend to clean or scrape the base of the sprockets. This can best be seen in FIG. 7. This is particularly important in drives where there is the potential for a buildup of material on the sprockets. Such a condition might occur in a material spreader, mill, or other device in which material may become caked on the sprockets.

Figure 8:
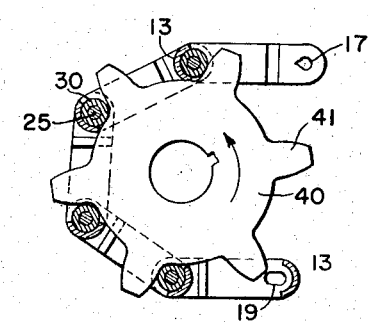
FIG. 8 is a view similar to FIG. 7 but showing the sprocket rotating in the opposite direction.

When the sprocket 40 is reversed, as shown in FIG. 8, the teeth 41 bear against the bushings 13. Here again the transverse edges of the bight portions 13 contact and scrape the base of the teeth to thereby protect them against buildup of material. The bushings 30, being relatively large, do not contact or damage the sprocket teeth 41. Also, the bushings 30 protect the pins 25 against bending or stresses that otherwise would occur if the teeth 41 made direct contact with the pins 25.

While only one form of the invention has been shown, it should be recognized that other forms and variations will occur to those skilled in the art. Therefore, while the invention has been shown in concise and detailed manner for the purpose of clearly and concisely illustrating the principles of the invention, it should be understood there is no intention to limit or narrow the invention beyond the broad concept set forth in the appended claims.

What is claimed is:

1. A chain link comprising: a U-shaped link member having opposite side portions opening at one end and closed at the opposite end by a bight portion with an inner surface facing the open end and an outer surface, the bight portion being arcuate shaped and formed substantially about an axis parallel to the bight portion; a pair of transversely aligned slots in the side portions adjacent the bight portions extending longitudinally of the side portions; a link pin extending through the slots and between the sides; a bushing member fixed to the pin with opposite ends closely adjacent the respective inner surfaces of the side portions and having an outer surface complementary to and engaging the inner arcuate surface of the bight portion, the bushing member further retaining the pin spacedly between the opposite longitudinal ends of the slots.

2. A chain link comprising: a U-shaped link member having opposite side portions opening at one end and closed at the opposite end by a bight portion with an inner surface facing the open and an outer surface, the bight portion being arcuate shaped and formed about an axis parallel to the bight portion; a pair of transversely aligned pin-receiving openings in the side portions adjacent the bight portions; a link pin substantially smaller than the openings extending through the openings and between the side portions; a bushing member fixed to the pin with opposite ends closely adjacent the respective inner surfaces of the side portions and having an outer surface complementary to and engaging the inner arcuate surface of the bight portion, the bushing member further retaining the pin spacedly from the edges of the openings.

3. A chain link comprising: an U-shaped link member having opposite side portions opening at one end and closed at the opposite end by a bight portion with an inner surface facing the open end and an outer surface, the bight portion being arcuate shaped and formed substantially about an axis parallel to the bight portion; a pair of transversely aligned pin-receiving openings in the side portions adjacent the bight portions; a link pin substantially smaller than the openings extending through the openings and between the sides; a spacer member fixed to the pin between the side portions having an outer surface complementary to the arcuate surface and engaging the inner arcuate surface of the bight portion for retaining the pin out of contact with the edges of the openings.

4. A chain comprising: a series of aligned chain links, each link being composed of a U-shaped member having opposite longitudinally extending sides open at one end and closed at the other end by a bight portion, the bight portion being arcuate and formed about a transverse axis substantially parallel to the bight portion, and the sides and bight portion having upper and lower continuous edges, the sides being further shaped whereby the free ends of the links lie alongside the closed end of the adjacent links, each link being further characterized by having transversely aligned pin-receiving openings in the sides adjacent its open and closed ends; link pins at the ends of the links, with each pin extending through the openings at the open end of a link and the openings at the closed end of an adjacent link, the link pins being substantially smaller than the latter openings; bushing members supported on the link pins between the sides and engaging the arcuate bight portions whereby the respective bight portions shall journal on the surfaces of the bushing members and the link pins shall be retained in spaced relation to the edges of the respective openings at the closed ends of the respective links; means fixing the links against rotation relative to the bushing members; and means fixing the links against rotation relative to the free ends of the respective links.

5. A chain comprising: a series of aligned U-shaped chain links having transverse bight portions and opposite longitudinally extending sides with the open ends lying alongside the closed ends of adjacent links, the bight portions being arcuate and formed about transverse axes substantially parallel to the bight portions, and the sides and bight portions having upper and lower continuous edges, each link being further characterized by having transversely aligned pin-receiving openings in the sides adjacent its open and closed ends; link pins at the ends of the links, with each pin extending through the openings at the open end of a link and the openings at the closed end of an adjacent link, the link pins being substantially smaller than the latter openings; and bushing members fixedly supported on the link pins between the sides and engaging the arcuate bight portions whereby the respective bight portions shall journal on the surfaces of the bushing members and the link pins shall be retained in spaced relation to the edges of the respective openings at the closed ends of the respective links.

6. A chain comprising: a series of aligned U-shaped chain links having transverse bight portions and oppo site longitudinally extending sides with the open ends lying alongside the closed ends of adjacent links, and the sides and bight portions have upper and lower continuous edges, each link being further characterized by having transversely aligned pin-receiving openings in the sides adjacent its open end and transversely aligned longitudinal slots adjacent its closed end; link pins at the ends of the links, with each pin extending through the openings at the open end of a link and the slots at the closed end of an adjacent link; and bushing members fixedly supported on the link pins between the sides and engaging the bight portions whereby the respective bight portions shall bear against the surfaces of the bushing members and the link pins shall be retained in spaced relation to the ends of the slots.

7. A chain comprising: a series of aligned U-shaped chain links having transverse bight portions and opposite longitudinally extending sides with the open ends lying alongside the closed ends of adjacent links, and the sides and bight portions have upper and lower continuous edges, each link being further characterized by having transversely aligned pin-receiving openings in the sides adjacent its open and closed ends; link pins at the ends of the links, with each pin extending through the openings at the open end of a link and the openings at the closed end of an adjacent link; and spacer members fixedly supported on the link pins between the sides and engaging the bight portions whereby the respective bight portions shall bear against the surfaces of the spacer members and the link pins are retained out of contact with the bight portions.

8. A chain comprising: a series of aligned chain links, each link being composed of a U-shaped member having opposite longitudinally extending sides open at one end and closed at the other end by a bight portion, the bight portion being arcuate shaped in cross section and formed about a transverse axis substantially parallel to the bight portion, the sides being further shaped whereby the free ends of the links lie alongside the closed end of the adjacent links, each link being further characterized by having transversely aligned pin-receiving openings in the sides adjacent the open and closed ends of the links; link pin structure at the ends of each link, with each pin structure having relatively small end portions projecting through the openings at the open end of one link and the openings at the closed end of an adjacent link so as to connect the links together, the ends of the link structures being substantially small than the openings adjacent the closed ends of the links, the pin structures further having enlarged central portions between the sides with radial shoulders adjacent the sides, the central portions having their outer surfaces engaging the arcuate bight portions whereby the respective links shall journal on the surfaces of the central portions and the ends of the link pin structures shall be retained in spaced relation to the edges of the respective openings at the closed ends of the links; and means fixing the link pin structures against rotation relative to the free ends of the respective links.

9. A chain comprising: a series of aligned chain links, each link being composed of a U-shaped member having opposite longitudinally extending sides open at one end and closed at the other end by a bight portion, the sides being further shaped whereby the free ends of the links lie alongside the closed ends of the adjacent links, each link being further characterized by having transversely aligned pin-receiving openings in the sides adjacent the open and closed ends of the links; link pin structure at the ends of each link, with each pin structure having relatively small end portions projecting through the openings at the open end of one link and the openings at the closed end of an adjacent link so as to connect the links together, the ends of the link structures being substantially smaller than the openings adjacent the closed ends of the links, the pin structures further having enlarged central portions between the sides engaging the bight portions whereby the respective links shall journal on the surfaces of the central portions and the ends of the link pin structures shall be retained in spaced relation to the edges of the respective openings at the closed ends of the links.

10. A chain comprising: a series of aligned chain links, each link being composed of a U-shaped member having opposite longitudinally extending sides open at one end and closed at the other end by a bight portion, the sides being further shaped whereby the free ends of the links lie alongside the closed ends of adjacent links, each link being further characterized by having transversely aligned pin-receiving openings in the sides adjacent the closed ends of the links; transverse link pin structure at the ends of each link, with each pin structure having relatively small ends fixed to one of the links adjacent its open end and projecting through the openings at the closed end of the adjacent link so as to connect the links together, the ends of the link structures being substantially smaller than the openings, the pin structures further having enlarged central portions between the sides engaging the bight portions whereby the respective links shall journal on the surfaces of the central portions and the ends of the link pin structures shall be retained in spaced relation to the edges of the respective openings at the closed ends of the links.

11. A pin and link structure for use in a link chain comprising: a U-shaped link member having opposite upright sides open at one end and closed at the other end by an upright transverse bight portion extending between the sides; a pair of transversely aligned pin-receiving openings in the sides adjacent the open and closed ends; and a transverse pin structure extending through the pin-receiving openings adjacent the closed end, the pin structure having small end portions smaller than the respective openings adjacent the closed end disposed in the latter openings and projecting outwardly of the sides for insertion in the openings at the open end of an adjacent link, and a large central portion between the sides bearing against the bight portion and for retaining the end portions out of contact with the edges of the pin-receiving openings adjacent the closed end.

12. The invention defined in claim 11 in which the large central portion is a cylindrical shaped bushing mounted on a pin to move therewith, and the opposite end portions of the pin are the portions extending through the openings.

13. The invention defined in claim 12 further characterized by the bight portion being arcuate shaped with an arcuate inner surface substantially of the radial dimension of the bushing outer surface.

14. The invention defined in claim 13 in which the pin-receiving openings at the closed end of the link are considerably larger than the end portions of the pin and that upon the bushing being seated in the arcuate shaped bight portion, the end portions are retained out of contact with the edges of said openings.

15. The invention defined in claim 11 in which the pin-receiving openings at the closed end of the link are sufficiently large to permit longitudinal movement of the pin structure in respect to the sides and upon the central portion being in contact with the bight portion the end portions are out of contact with the edges of the openings.

16. The invention defined in claim 11 in which the pin-receiving openings at the closed end of the link are longitudinal slots permitting longitudinal movement of the pin structure in respect to the sides and upon the central portion being in contact with the bight portion the end portions are out of contact with the ends of the slots.

17. The invention defined in claim 11 in which the openings at the closed end of the link are sufficiently large to permit movement of the end portions within the openings and the large central portion is larger than the openings and has radial shoulders closely adjacent the respective sides.

References Cited

UNITED STATES PATENTS

| | | | |
|---|---|---|---|
| 764,298 | 2/1903 | Ley | 74—255 |
| 839,849 | 1/1907 | Horst | 74—255 |
| 2,553,646 | 5/1951 | Field | 74—255 |
| 2,773,971 | 12/1956 | Teerlink | 74—245 X |
| 3,054,301 | 9/1962 | Kummerer et al. | 74—250 |
| 3,062,067 | 11/1962 | Deming | 74—245 |
| 3,192,785 | 7/1965 | Pearson | 74—256 |

FRED C. MATTERN, Jr., *Primary Examiner.*

DAVID J. WILLIAMOWSKY, *Examiner.*

C. J. HUSAR, *Assistant Examiner.*